United States Patent
Siess et al.

(10) Patent No.: US 6,644,125 B1
(45) Date of Patent: Nov. 11, 2003

(54) PRESSURE SENSOR

(75) Inventors: Thorsten Siess, Wuerselen (DE); Christoph Nix, Stolberg (DE)

(73) Assignee: Impella Cardiotechnik AG, Aachen (DE)

( * ) Notice: Subject to any disclaimer, the term of this patent is extended or adjusted under 35 U.S.C. 154(b) by 0 days.

(21) Appl. No.: 09/857,122

(22) PCT Filed: Nov. 17, 1999

(86) PCT No.: PCT/EP99/08834

§ 371 (c)(1),
(2), (4) Date: Jun. 1, 2001

(87) PCT Pub. No.: WO00/33047

PCT Pub. Date: Jun. 8, 2000

(30) Foreign Application Priority Data

Dec. 2, 1998 (DE) .................................. 298 21 563 U

(51) Int. Cl.⁷ ................................................. G01L 9/06
(52) U.S. Cl. ............................. 73/754; 73/715; 73/718; 73/724
(58) Field of Search .......................... 73/754, 718, 724, 73/741, 721, 715; 338/114; 361/283, 283.1, 283.4

(56) References Cited

U.S. PATENT DOCUMENTS

| 4,023,562 | A | * | 5/1977 | Hynecek et al. ........... 128/2.05 |
| 4,274,423 | A | | 6/1981 | Mizuno et al. |
| 4,763,098 | A | | 8/1988 | Glenn et al. |
| 4,914,416 | A | * | 4/1990 | Kunikane .................... 338/114 |
| 5,090,246 | A | * | 2/1992 | Colla et al. ................... 73/718 |
| 5,581,038 | A | | 12/1996 | Lampropoulos et al. |

FOREIGN PATENT DOCUMENTS

| DE | 3937522 A1 | 5/1991 |
| EP | 61132832 | 6/1986 |
| EP | 0354479 A2 | 2/1990 |
| EP | 0801293 A3 | 1/1997 |
| WO | WO 92/12408 A1 | 7/1992 |

* cited by examiner

Primary Examiner—Andrew H. Hirshfeld
Assistant Examiner—Marissa Ferguson
(74) Attorney, Agent, or Firm—Fulwider Patton Lee & Utecht, L.L.P.

(57) ABSTRACT

The invention relates to a pressure sensor consisting of a chip (11) which is mounted on a support wall (10) and which is provided with a resistance unit consisting of strip conductors and being arranged at the lower side (13) of a substrate (12). Said lower side faces the support wall (10). The resistance unit is located on a thin membrane (18). A recess (19) is located behind said membrane. The chip (11) is fixed on the support wall (10) by means of an elastic intermediate layer (26). The electrical components of the chip are protectively arranged between the substrate (12) and the support wall (10). The invention provides for an extremely flat sensor unit without additional sensor housing. Said sensor unit can even be used for measuring pressures in electrically conductive mediums.

9 Claims, 1 Drawing Sheet

PRESSURE SENSOR

Figure 1:
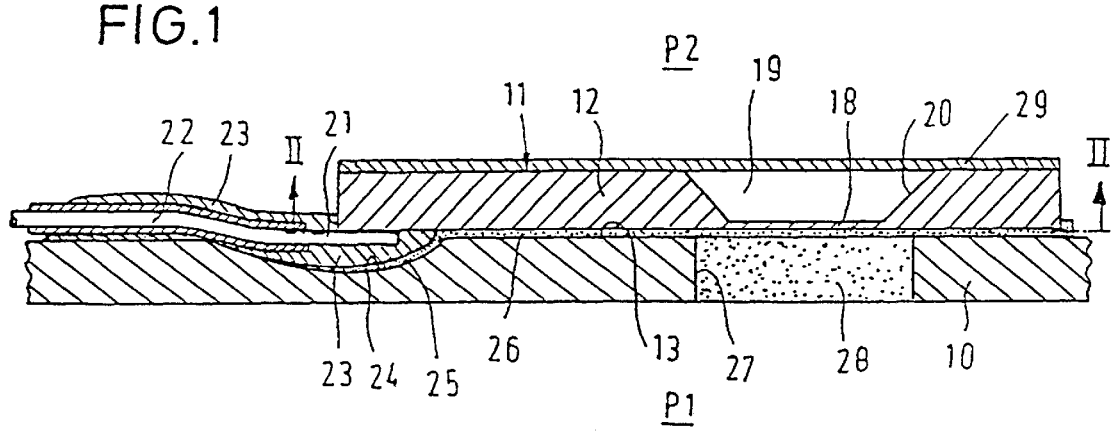

The invention refers to a non-capsulated housingless pressure sensor for measuring the pressure in a liquid or gaseous medium and, in particular, to a pressure sensor with a resistance unit of strip conductors arranged on a substrate in the form of a semiconductor chip.

In measuring liquid pressure, e.g. blood pressure within a blood vessel, it is known to use a pressure sensor within a catheter, which comprises a semiconductor chip having a resistance unit provided thereon. Below the resistance unit, the semiconductor chip forming the substrate is provided with a recess so that a very thin wall thickness is given at the measuring site. Due to the action of the pressure, the thin wall is bent, whereby different degrees of extension occur in the resistors of the resistance unit. Thus, it is possible to determine the pressure acting on the substrate from the voltage change measured at the resistance unit. The substrate is adhered to a support wall which may in turn be situated in a catheter, the resistance unit being located on the side of the substrate averted from the support wall. Since this side is exposed to the medium whose pressure is to be measured, it is coated with an additional passivation layer that prevents contact between the medium and the resistance unit or the substrate, respectively. It is true that all electric components of the pressure sensor are covered, but electrocorrosion can occur, in particular when the pressure sensor is operated in electrically conductive liquids, which electrocorrosion may cause a loss of the sensor or an inherent sensor drift. Moreover, possible damages of the passivation layer have a direct effect on the functional behavior of the sensor. Finally, the use of such pressure sensors in the blood circulation poses certain problems, since fluid-related erroneous measurements and deposition of blood components may occur.

From DE 39 37 522 A1, a semiconductor pressure sensor is known that has a support wall and a semiconductor substrate. A pressure transmission opening is provided in the substrate. The opening is formed as a recess in the substrate and delimited by a membrane. The resistance unit is located on the side of the substrate that abuts on the support wall. Between the substrate and the support wall, an elastomer seal is provided. However, the latter does not extend over the membrane region.

It is the object of the present invention to provide a non-capsulated housingless pressure sensor that is insensitive to damage and which can, in particular, be used as a small-sized high precision sensor.

According to the present invention, the object is solved with the features of claim 1.

In the present pressure sensor, the side of the substrate on which the resistance unit is provided faces the support wall, with an elastic intermediate layer being provided between the support wall and the substrate. With this pressure sensor, the electric components provided on the substrate are protected between the substrate and the support wall. Should external influences cause damages to the sensor, these remain non-critical for the function because only the top surface of the substrate or the chip is affected. Because of the protected accommodation of the resistance unit, the sensor can be operated in electrically conductive liquids, without electrocorrosion causing sensor loss or an inherent sensor drift. In as far as insulating layers are required, these can be kept extremely thin. The present housingless pressure sensor design results in a small-sized and flat arrangement and can be integrated in a thin support wall of a few tenths of a millimeter without protruding. The support wall may be planar or bent at a tube. Further, the pressure sensor is insensitive to light, since the electrically and possibly photogalvanically active surface is arranged in a light-tight manner between the substrate and the support wall. The present invention provides for an extremely flat sensor means without any additional sensor housing, the sensor means even being adapted to measure pressures in electrically conductive media. The insulating intermediate layer between the support wall and the substrate is elastic. This means that this intermediate layer allows for certain movements of the sensor relative to the support wall so that the substrate is held on the support wall in a floating manner, so to speak. Thereby, the sensor is mechanically decoupled from the support wall and it is made sure that mechanical or temperature-related deformations of the support wall cause no substantial electrical signals. Preferably, silicone material is used for the intermediate layer.

According to a preferred embodiment of the invention, the resistance unit is provided on a thin membrane of the substrate which is flush with the substrate surface facing the support wall, a recess being provided behind the membrane. The diameter of the recess is in the order of 0.1 to 0.6 mm so that the recess is too small to reach and damage the sunk-in thin membrane with usual tools such as pincers.

Another advantage is that wires connected to the bottom surface of the substrate can be glued or cemented directly to the support wall, whereby stress relief is obtained at the connection site. Further, the connection area whose insulation is critical, is mechanically protected due to its being arranged between the substrate and the support wall.

The present pressure sensor may be designed as an absolute pressure sensor. Here, the recess in the substrate is evacuated and covered with a vacuum-tight layer. On the other hand, it is possible to design the pressure sensor as a differential pressure sensor, where both sides of the support wall, and thus also both sides of the thin membrane, are subjected to different pressures.

The following is a detailed description of embodiments of the invention with reference to the drawings.

Figure 2:
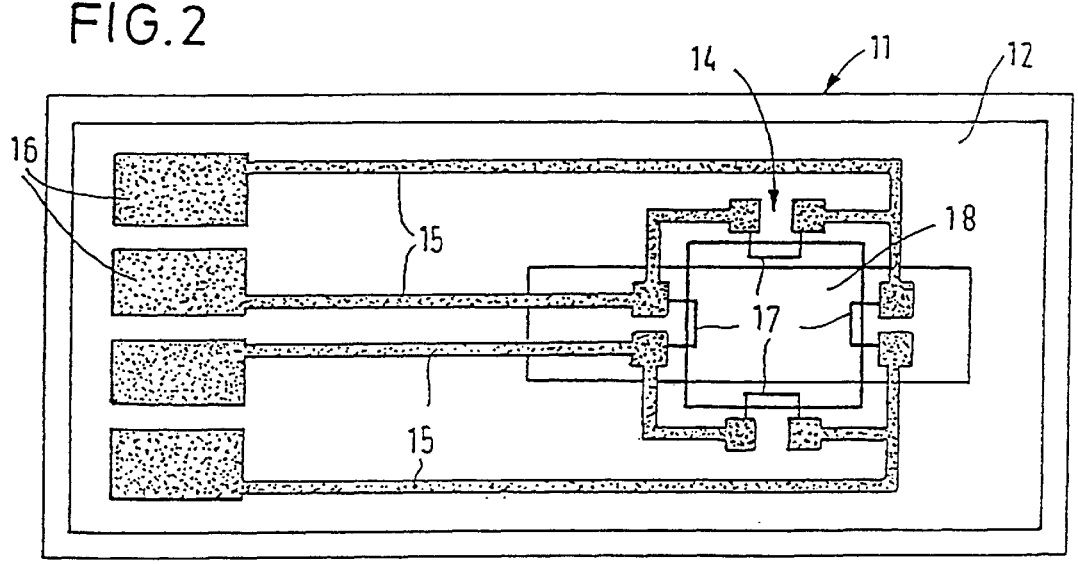
Figure 3:
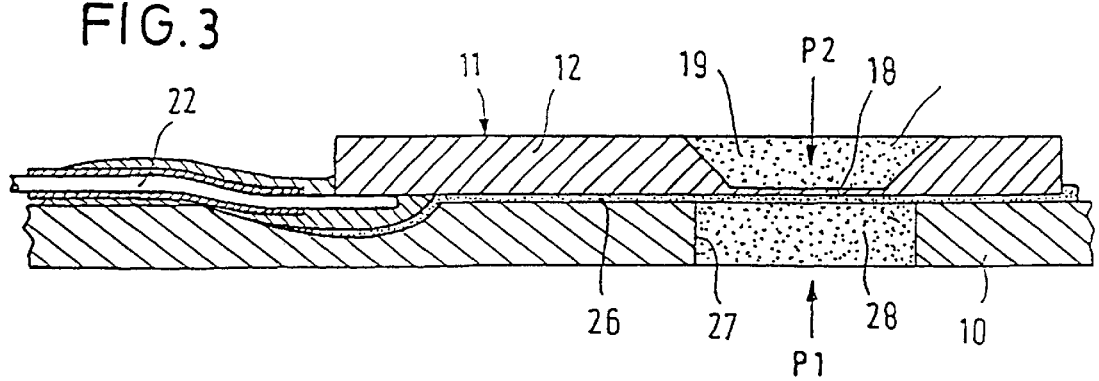

In the Figures:

FIG. 1 is a sectional view through a first embodiment of the pressure sensor designed as an absolute pressure sensor, FIG. 2 is a bottom view on the substrate from the direction of the arrow II—II in FIG. 1, and FIG. 3 is a sectional view of a pressure sensor designed as a differential pressure sensor.

The pressure sensor of FIGS. 1 and 2 has a support wall 10 that forms a barrier between a pressure P1 on one side of the support wall and the environment. It is assumed that the pressure P2 prevails in the environment. The support wall 10, preferably only a few tenths of a millimeter in thickness, is made of a rigid gas-tight material, in particular of metal. It may be planar, yet it is also possible to provide a cylindrical or otherwise shaped member.

A chip 11 is provided on the support wall 10, comprising a substrate 12 with an electrical resistance unit 14 on the bottom surface 13 facing the support wall 10, as illustrated in FIG. 2. The substrate 12 is made of highly pure silicon and has a thickness of about 200 $\mu$m. In the present case, it is a rectangular disc of 1,400 $\mu$m×600 $\mu$m in size. The substrate 12 is provided with strip conductors 15 applied using the deposition and etch processes conventional with semiconductor production. Together with the strip conductors 15, contact surfaces 16 are formed that may be connected to external wires. The strip conductors 15 are further connected to resistor bridges 17 to form a bridge circuit. In the present case, four resistor bridges 17 are provided, forming a conventional bridge circuit. The resistor bridges 17 comprise narrow, and thus high-ohmage sections of the strip conductors 15. The resistance bridges 17 are provided in the region of a membrane 18. This membrane 18 comprises a thin wall of the substrate 12 left in the region of a recess 19. The recess 19 corresponds to a truncated pyramid with inclined flanks 20. The length of the edges is 250 $\mu$m. The thickness of the membrane 18 is about 10 $\mu$m. The membrane 18 extends on the bottom surface of the substrate 12 so that this lower side is smooth overall, i.e. it presents no indentations or protrusions.

The conductors 21 of sensor wires 22 are planarly bonded or connected to contact surfaces 16. These sensor wires 22 have their insulations fixed on the support plate 10 by means of an epoxy adhesive 23. In the support plate 10, a cutout 24 is provided into which the conductors 21 enter so that their ends are accommodated below the substrate 12. The cutout 24 is filled with an insulating and elastic plastics mass 25 similar to that of the elastic intermediate layer 26.

Between the bottom surface 13 of the chip 11 and the support wall 10, another elastic intermediate layer 26 of silicon material is provided. This layer 26 extends over the entire bottom face of the substrate 12, including the membrane 18. The chip 11 is supported floating on the intermediate layer 26.

In the support plate 10, a pressure transmitting opening 27 is provided below the membrane 18 that extends through the entire thickness of the support plate. The pressure transmitting opening 27 is filled with a filling 28 consisting of the material of the intermediate layer 26 or of a pressure transmitting gel. The bottom side of the filling 28 is flush with the bottom side of the support wall 10. As a result, the medium delimited by the support wall 10 cannot enter the pressure transmitting opening 27 and cannot deposit there. Moreover, high flow rates at the bottom side of the support plate cannot lead to pressure artefacts because of the stepless transition between the support plate and the filling 28.

The top surface of the chip 11 that forms the rear side, is covered with a vacuum-tight layer 29 that may also be made of silicon. This layer 29 closes the recess 19 off to the outside. The recess 19 is evacuated. The pressure acting on the membrane 18 via the filling 28 is the pressure P1 and the deformation of the membrane 18 depends exclusively on this pressure P1. Accordingly, the pressure sensor is an absolute pressure sensor.

FIG. 3 illustrates the embodiment of FIG. 1 in a modified form as a differential pressure sensor. Here, the layer 29 has been omitted so that the pressure P1 acts on one side of the membrane and the pressure P2 acts on the rear side of the membrane. The differential pressure sensor thus measures the difference P1 minus P2. Here, the recess 19 may be filled with a pressure transmitting gel 30 or with silicone.

What is claimed is:

1. A pressure sensor comprising a resistance unit having strip conductors that are arranged on a planar side of a substrate, a support wall to which the substrate is attached such that said planar side of the substrate on which the resistance unit is provided faces the support wall, wherein the support wall has a pressure transmitting opening formed therein, and an elastic intermediate layer arranged between the support wall and the substrate, wherein contact surfaces are provided on the planar side of the substrate bearing the resistance unit and wherein the contact surfaces are planarly connected to connecting wires that plunge into a cutout that is formed in the surface of the support wall that faces the substrate.

2. The pressure sensor of claim 1, wherein the resistance unit is provided on a thin membrane of the substrate which is flush with the surface of the substrate facing the support wall, a recess being provided behind the membrane.

3. The pressure sensor of claim 2, wherein the recess of the substrate is evacuated and covered with a vacuum-tight layer.

4. The pressure sensor of claim 3, wherein the cutout is filled with an insulating and elastic plastics mass.

5. The pressure sensor of claim 1, wherein the pressure transmitting opening is substaintially filled with the material of the intermediate layer.

6. The pressure of claim 5, wherein the cutout is filled with an insulating and elastic plastic mass.

7. The pressure sensor of claim 5, wherein the resistance unit is provided with a thin membrane of the substrate which is flush with the surface of the substrate facing the support wall, a recess being provided behind the membrane.

8. The pressure sensor of claim 7, wherein the cutout is filled with an insulating and elastic plastic mass.

9. The pressure sensor of claim 1, wherein the cutout is filled with an insulating and elastic plastic mass.

* * * * *